Sept. 22, 1959        R. A. BRODING        2,905,258

MEASUREMENT OF SEISMIC TRAVEL TIME

Filed Nov. 26, 1952        4 Sheets-Sheet 1

ROBERT A. BRODING
*INVENTOR.*

BY *D. Carl Richards*
ATTORNEY

Fig. 2

ROBERT A. BRODING
INVENTOR.

Sept. 22, 1959 R. A. BRODING 2,905,258
MEASUREMENT OF SEISMIC TRAVEL TIME
Filed Nov. 26, 1952 4 Sheets-Sheet 4

ROBERT A. BRODING
INVENTOR.

BY *D. Carl Richards*
ATTORNEY

United States Patent Office 2,905,258
Patented Sept. 22, 1959

---

2,905,258

MEASUREMENT OF SEISMIC TRAVEL TIME

Robert A. Broding, Dallas, Tex., assignor, by mesne assignments, to Socony Mobil Oil Company, Inc., a corporation of New York Application November 26, 1952, Serial No. 322,718

20 Claims. (Cl. 181—.5)

This invention relates to the measurement of travel time of acoustic energy through earth sections and more particularly to producing a continuous measurement of the time of travel of acoustic energy from the earth's surface through the sedimentary sections of the earth's crust. The invention is related to acoustic well logging and the utilization of continuous velocity well logging data which is integrated to produce indicia of travel times along selected paths.

The present invention is particularly useful in connection with interpretation of seismograms obtained in exploring sedimentary sections of the earth for structures indicative of petroleum deposits. The invention also is useful in the determination of the type of formations penetrated by a bore hole.

In seismic exploration the time interval required for acoustic energy to travel from the earth's surface to a sub-surface reflecting interface and back to detectors at the surface is measured. The seismic procedure, however, includes as a paramount aim the determination of the actual depth of such reflecting interfaces. In many instances, velocity data is not available to permit the translation of the time scale on a seismic record into a spaced or depth scale. General practice therefore, is to obtain detailed velocity data in any area where seismic investigations are initiated just as soon as a well or wells are available for running the necessary velocity surveys. The conventional method of obtaining such velocity data is to lower a seismic detector into a well drilled into or through the sedimentary section and then to detonate explosive charges at the earth's surface adjacent the well with the detector successively positioned at different points of interest along the length of the well. Since the depth of the detector is carefully measured by means of its supporting cable, the time required for the energy to travel from the surface to the detector may be utilized to determine the average velocity of the seismic energy over the earth section separating the explosive charge and the detector.

The foregoing procedure has been found to be extremely useful, but it is accurate only in so far as the arrival of a pulse at a detector may be accurately determined. For some purposes the data thus obtained is ambiguous because the depths of velocity interfaces are not known and are by-passed in locating the detector so that interpolations cannot safely be made. In avoidance of this problem a system disclosed in Patent No. 2,704,364 of Gerald C. Summers provides for a continuous measurement of incremental travel time or velocity data.

In accordance with the present invention the acoustic travel time characteristic of earth formations penetrated by a bore hole is measured continuously over the length of the bore hole and is integrated with respect to bore hole depth to produce a recording or other indicia indicative of the travel time from datum to each acoustic interface.

Broadly the invention comprehends two distinct approaches to the above stated problem. The first approach includes the steps of acoustically probing restricted earth segments at successively and continuously changing locations between two points along a bore hole and generating a signal whose amplitude varies in accordance with variations in travel time of acoustic pulses through the restricted earth sections. The signal is integrated and a line integral is registered as one variable on a scale related to distance along the bore hole between the selected points to produce a record of travel time from said points to each velocity interface.

In accordance with the second approach, an acoustic travel time characteristic of the formation is measured as restricted earth segments located at continuously increasing depths are acoustically probed to produce a record clearly indicating regions of velocity contrasts. Thereafter an independent signal is transmitted over the entire earth section between the surface and the different zones of acoustic velocity contrast in an order of successively shorter sections, and total travel time over each section is recorded.

In another aspect of the invention earth segments of constant length are acoustically probed over a section beginning at a first point along the wall of a bore hole and changing progressively to a second point in the bore hole. A signal is generated in response to the probing having a magnitude which is maintained proportional to the incremental travel time of the pulses through the constant length earth segments. More particularly, this signal is equal to said incremental travel time multiplied by a scaling factor which factor is the time rate of change of output of a monotonically varying function generator which may be of the type described in said Patent No. 2,704,364. More particularly and as set forth in said patent the function generator may be of the type well known in the art as a bootstrap linear sweep generator with a compensating network. The signal thus produced is integrated to produce a first line integral having time as one variable and distance from the first point as a second variable. The line integral is then recorded or registered on a suitable depth scale to provide a clear indication of variations in the transmission time character of the formations. A correcting function equal to the line integral of the product of the scaling factor multiplied by the formation driving time of the transducers is produced and modifies the first line integral to produce a function which is equal to the travel time of a pulse from the first selected point to the second selected point in the bore hole.

For a further understanding of the present invention and for a more complete description thereof, reference may now be had to the following description taken in conjunction with the accompanying drawings in which.

Figures 1, 3, 5, 7:
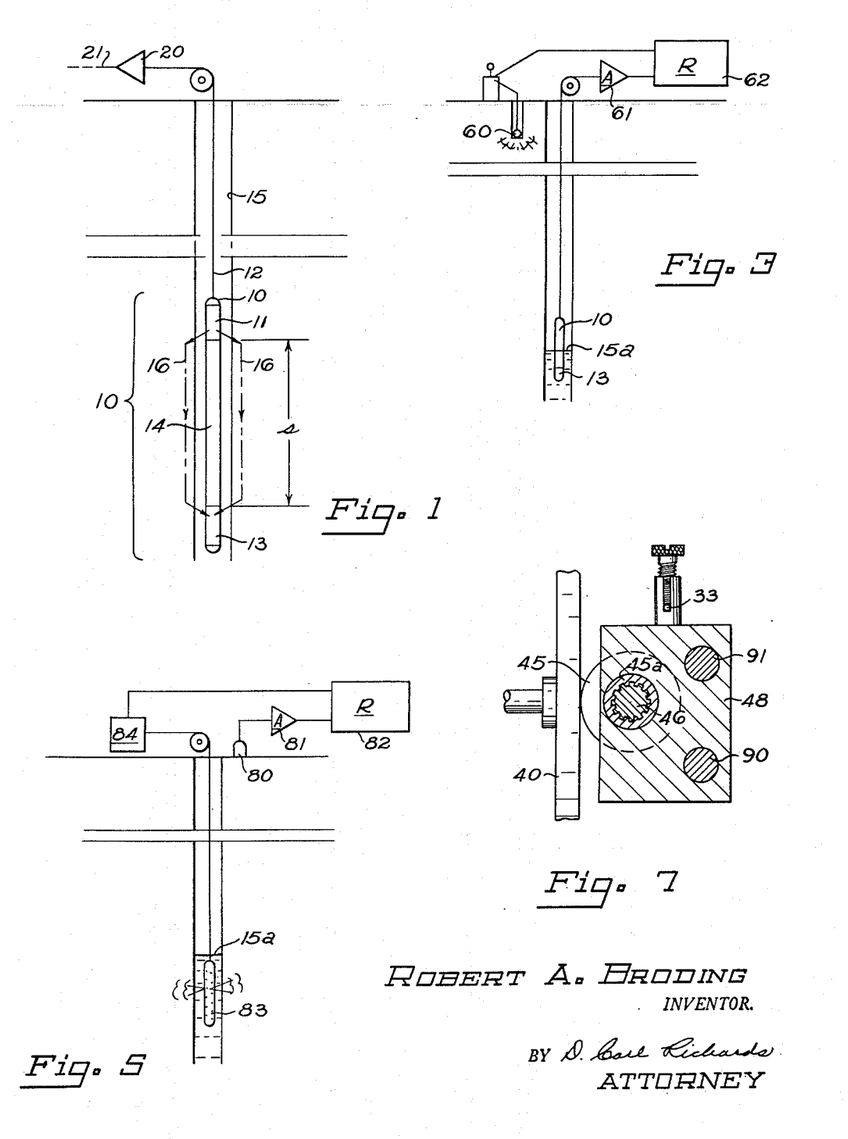
Fig. 1 is a schematic diagram of a continuous velocity logging system.
Fig. 3 illustrates one method of locating a sub-surface reference datum.
Fig. 5 illustrates an alternative method for locating a subsurface reference datum.
Fig. 7 is a section of the carriage member taken along the lines 7—7 of Fig. 2.

Referring now to Fig. 1, there is illustrated a bore hole unit 10 comprising a transmitter 11 supported by a cable 12 extending to the surface of the earth. A receiver 13 is supported and maintained a predetermined distance from the receiver 11 by an acoustic insulator unit 14 of length $s$. As will hereinafter be explained, periodically recurring acoustic pulses are generated by transmitter 11. After traveling through the formation adjacent the bore hole 15 as along paths 16, the pulses are detected by receiver 13. The time required for a pulse to travel paths 16 is a measure of the velocity characteristic of the restricted earth section covered by paths 16.

In accordance with the present invention, the bore hole unit 10 of Fig. 1 is moved along the entire length of a bore hole to produce a first primary log function which is a continuous indication of formation velocities. A suitable system for producing such a continuous velocity indication is illustrated in detail and forms the basis of co-pending application Serial No. 192,750, filed by Gerald C. Summers, a co-worker of applicant, now issued as Patent No. 2,704,364 dated March 15, 1955. In accordance with the above-mentioned patent, a detecting unit 20 is responsive (1) to the generation of a pulse by transmitter 11 and (2) to the detection of such pulse upon the arrival at receiver 13. Unit 20 produces a voltage in its output channel 21 unidirectional in character and in magnitude dependent upon the travel time of a pulse over paths 16. It is this unidirectional output voltage indicative of the velocity character of a restricted earth section and appearing in channel 21 which is utilized in accordance with the present invention to produce a new and distinctive log of properties of the formations.

It will be appreciated that in order to measure the time required for a pulse to travel over length $s$, Fig. 1, the pulse must be transmitted from the exploring unit to the formation and from the formation to the receiver in the exploring unit and that a time interval necessarily is involved that is not related to formation character. As will hereinafter be explained, a suitable correction is made in the logs produced to eliminate this error which otherwise might be present. It has been found that the instrument error that must be considered is constant and is believed due principally to the complex mode of operation of the transmitter and receiver. The method of eliminating instrument error will later be described.

Figure 2:
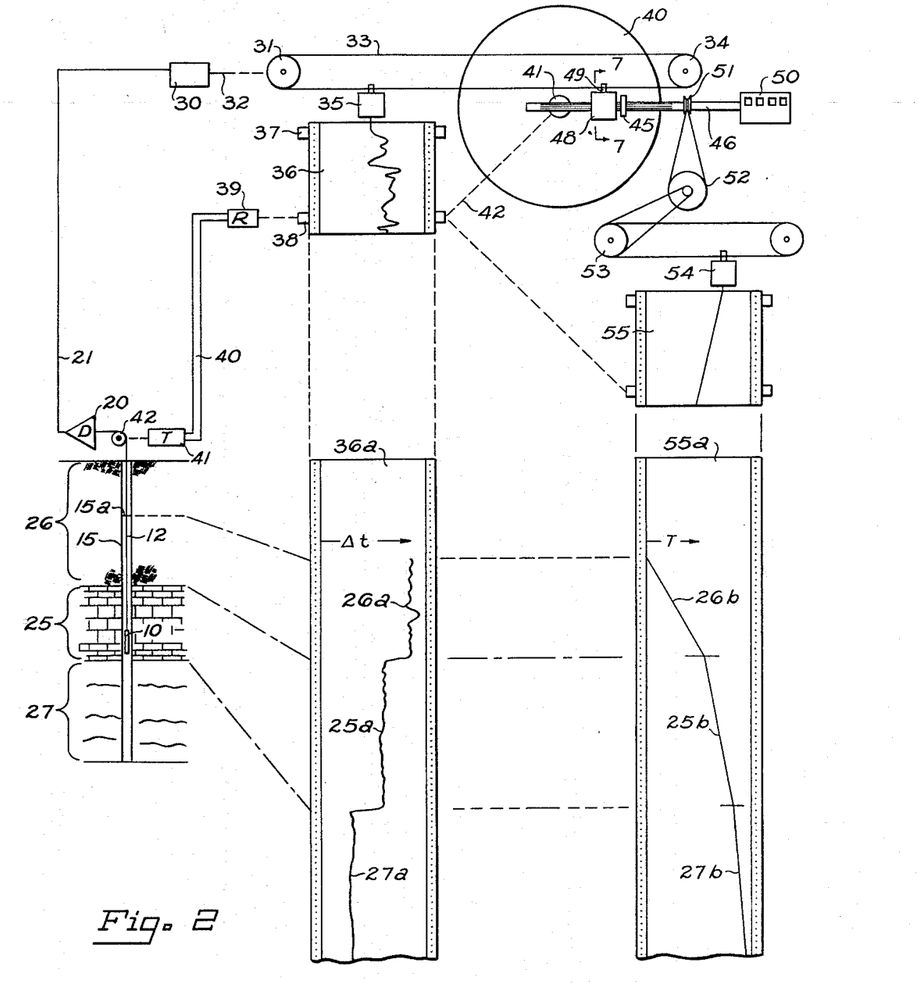
Fig. 2 is a more detailed illustration of a velocity well logging system embodying applicant's invention.

Fig. 2 includes parts of the system shown in Fig. 1 in order to illustrate the manner in which the acoustic data is utilized to provide a detailed and truly representative analysis of the acoustic properties of formations penetrated by the bore hole. Where consistent, elements common to Figs. 1 and 2 have been given the same reference characters.

The exploring unit 10 is supported in bore hole 15 on cable 12. The detecting circuit 20 produces an output voltage on the channel 21 proportional to the travel time of an acoustic pulse through a small section of the formation 25. The strata 25 is positioned between a surface strata 26 and a deeper strata 27. It will be assumed, for the purpose of the present description, that the interfaces between the respective strata 25—27 are marked by a substantial contrast in acoustic velocity and the contrasts are characterized by an increase in velocity with increasing depth.

The output voltage on channel 21 is applied to a system 30 which includes a motor for driving a pulley 31 by way of driving connection 32. Pulley 31 may conveniently be the pen actuating member of a conventional chart recorder such as manufactured and sold under the trade name Speedomax, by Leeds and Northrup Company of Philadelphia, Pennsylvania. A belt 33 operatively connected between pulley 31 and pulley 34 carries a pen carriage 35 laterally across a recording chart 36. The position of the pen carriage is thus varied in proportion to variations in the velocity function voltage on channel 21.

Chart 36 is supported on an upper roller 37 and a lower driving roller 38. The driving roller 38 for the chart recorder is actuated in response to a Selsyn receiver 39. The receiver 39, in accordance with the present invention, is driven by way of channel 40 from a transmitter 41 which, in turn, is controlled by the measuring wheel 42 which supports and "measures" the length of cable 12 as unit 10 is moved along bore hole 15. With this system, while variations in the position of the pen carriage 35 laterally of the recording chart 36 are proportioned by one primary log function, i.e., the travel time of a pulse over the formation section spanned by the exploring unit 10, the position of the pen longitudinally of the chart 36 is proportioned by a second primary log function, i.e., bore hole depth. An idealized incremental or primary or $\Delta t$ log 36a is shown opposite the bore hole and illustrates the decreasing travel times for the restricted earth section generally encountered at succeedingly increasing depths. The purpose of including this primary log is to portray the more general case encountered in field practices in which the bore hole fluid does not extend to the earth's surface but rather stands at some datum below the earth's surface. As here shown, the level of the fluids in the bore hole is assumed to be at point 15a. Since the velocity tool requires a liquid medium in the bore hole to couple the acoustic energy to the formations, a velocity log cannot conveniently be obtained above point 15a i.e. in the open hole section. However, below that point the velocity of formation 26 is found to be relatively low, thus requiring a long interval $\Delta t$ as depicted by the portion 26a of the chart 36a. A higher velocity in the intermediate strata 25 is depicted by a correspondingly smaller interval as indicated by the portion 25a of the chart 36a. Similarly, the high velocity formation 27 is indicated on chart 36a by a still smaller interval in the section 27a.

In accordance with one aspect of the present invention, the $\Delta t$ log 36a is integrated to produce a second log or other indicia which is a measure of the total travel time T from a reference datum to any depth in the well bore. One way to produce such an indicia is to utilize the movements of the belt 33 on pulleys 31 and 34 as a velocity function to actuate a mechanical integrator to integrate the $\Delta t$ log on chart 36a to produce a new record of total travel time T. More particularly, a disk 40 is mounted for rotation about an axis passing through the center 41. Disk 40 is driven under the control of (or in proportion to) a movement of the chart 36 or the rotation of the driving roller 38. A driving connection has been diagrammatically represented by the dotted line 42. The rotation of disk 40 is made to be directly proportional to the depth function or travel of the exploring unit 10 along the length of bore hole 15. A disk follower or wheel 45 is mounted on a splined shaft 46 for rotation of both wheel 45 and shaft 46 in response to rotation of the disk 40. The follower wheel 45 is maintained in pressure contact with the face of the disk 40 and is movable along a line passing through the axis 41 along the splines in the shaft 46. The radius to the point of contact of the follower wheel 45 on disk 40 is controlled by belt 33 and is thus made directly proportional to $\Delta t$, the interval velocities of the formations. The follower carriage 48 is secured to belt 33 at point 49. Thus when the pen carriage 35 moves in response to a variation in the $\Delta t$ characteristic of the formation, the follower wheel 45 also moves. When the downhole unit 10 is adjacent the low velocity-high $\Delta t$ formation 26, follower wheel 45 is positioned by belt 33 at a large radius on disk 40, thus rotating shaft 46 relatively rapidly for a given change in depth as reflected by a rotation of disk 40. Conversely, when the unit 10 is adjacent the high velocity-low $\Delta t$ formation 27, the radius of the point of contact of wheel 45 on disk 40 is small, thus driving shaft 46 at a relatively slow rate. A counter 50 has been illustrated as driven by shaft 46 to provide an indication of the number of revolutions of shaft 46 which is a function of the integral of the curve on chart 36a. Alternatively, a pulley 51 mounted on shaft 46 drives a second pulley 52, which, in turn, drives a pulley 53. A second pen carriage 54 associated with the recording chart 55 may be utilized to record the integral of the curve on chart 36a. Thus while pen carriage 35 varies in proportion to the Δt characteristic of the formations, the pen carriage 54 varies with respect to chart 55 in dependence upon the total travel time of sound through the formations.

The integrated log corresponding to chart 36 is represented by chart 55a. Throughout the low velocity formation 26 the total time required for travel of a pulse from point 15a to any deeper point increases at a rapid rate as indicated by the low negative slope of portion 26b of chart 55a. In the intermediate velocity zone the increase in total travel time is at a relatively slower rate as shown by the portion 25b, while in the high velocity zone the increase in total travel time occurs at an even lower rate as shown by the portion 27b. However, at any point along the length of chart 55a the distance from the left-hand margin is a measure of travel time from point 15a to the depth corresponding with the selected point.

The log on chart 55a clearly shows interfaces between formations of contrasting velocities by reason of the change in slope of the curve. The slope of the curve formed by line segments 25b, 26b and 27b at any point therealong is, with reference to the base axis along the left hand margin of chart 55a proportional to the reciprocal of velocity. The new log 55a is of utility from the standpoint of ultimate use particularly in connection with analysis of seismographic data separate and apart from a more conventional record such as 36a. It has been found that the depths of velocity interfaces can thus be located with accuracy and that the velocities to be utilized in the detailed computations in seismic exploration may be accurately determined.

While the line chart 55a clearly shows velocity interfaces and velocity character of the formations, it is limited in the resolution of total travel time simply because of its size. It is desirable to read total travel time to at least four significant figures, that is to be able to read the travel time of a sound wave from a given datum to a selected subsurface point to a time accuracy in the order of ±0.001 second. This can be done if an operator merely notes at each depth of interest the reading of counter 50. However, the reading can be recorded automatically as a function of depth on a recorder provided with a print wheel type of translating device. For example, the number on the counter 50 may be printed on a tape at each five foot depth point in the well bore to provide a record of as high a resolution as is desired in the ultimate use of the travel time data.

While the foregoing description has assumed the general case in which the liquid level is substantially below the surface, it is to be understood that measurements beginning at the surface may similarly be made where the liquid completely fills the bore hole. In instances where the latter is not possible, the travel time to the datum plane, the depth 15a of the bore hole liquid, may be obtained by using either of the systems shown in Figs. 3, 4 or 5 which will now be described.

Referring to Fig. 3, the exploring unit 10 is positioned with its detector unit 13 at or slightly below the liquid level 15a. An explosive charge 60 is detonated at a depth known with respect to the earth's surface. The time interval required for travel of the acoustic wave thus generated to reach detector 13 may be determined by recording the instant of detonation and the instant of arrival of the pulse at detector 13. An amplifier 61 and conventional recording unit 62 may be thus utilized to measure this time interval and thus establish a time datum plane for the liquid level 15a.

Figures 4, 9:
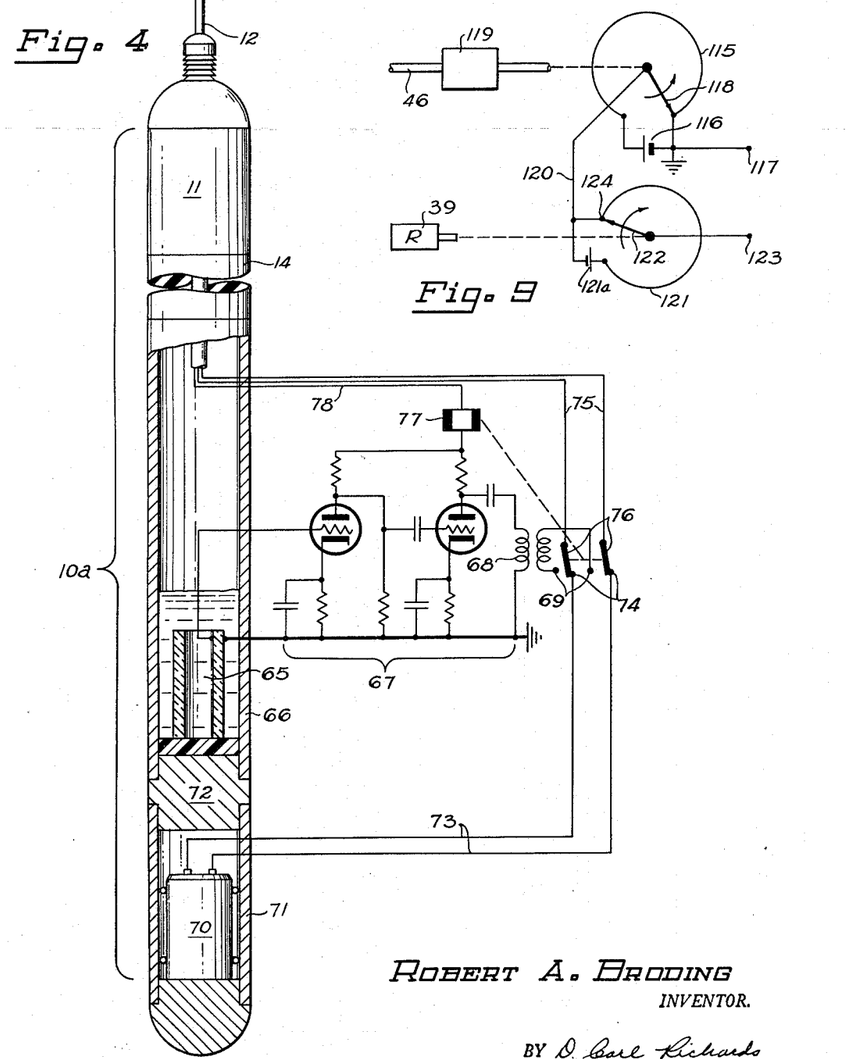
Fig. 4 is a schematic diagram illustrating in detail a portion of the system of Fig. 3.
Fig. 9 illustrates one form of air correction means.

In Fig. 4 a bore hole unit particularly suitable for carrying out the operation illustrated in Fig. 3 has been shown. In general the bore hole unit will correspond with that disclosed in the above-mentioned Summers application Patent No. 2,704,364 but where there is a difference in structure it has been shown in Fig. 4 and will now be described. A detector for the continuous logging operation may comprise a crystal 65 supported in a housing 66 (inundated in a liquid) and connected to the input of an amplifying system 67 for applying to output transformer 68 an electrical pulse coincident with the reception of each acoustic pulse generated by the transmitter 11. The secondary of transformer 68 is connected to switch terminals 69. A seismometer 70 supported in a cylindrical housing 71, which is connected to the housing 66 by a coupling 72, is connected at its output by way of conductors 73 to switch terminals 74. Conductors 75 extending through the cable 12 to the earth's surface are connected to switch armatures 76. The switch armatures 76 normally complete a circuit to seismometer 70. However when a positive voltage is applied to the bore hole circuit conductor 78 as plate potential for amplifier 67, the resultant current flow actuates the relay coil 77 connected in series with conductor 78 to connect the armatures 76 to terminals 69 and thus complete a circuit from crystal 65 to the conductors 75.

In operation the unit 10a, which includes not only a continuous velocity logging system but also the seismometer 70, is initially located at the liquid level 15a, Fig. 3, or at a selected lower point, and dynamite 60, Fig. 3, is detonated to establish a time datum corresponding to the depth position of the bore hole unit 10.

Further, it will be appreciated that crystal 65 of Fig. 4 may also be used, if desired, to detect an acoustic pulse produced by detonation of an explosive charge such as described in connection with Fig. 3. In any event, the time datum may be established with respect to the level 15a of the liquid, and thereafter the system illustrated in Figs. 1 and 2 may be utilized to produce data such as illustrated on the integrated log on chart 55a. Alternatively, as illustrated in Fig. 5, a detector 80 positioned on the surface of the earth is connected by way of amplifier 81 to recorder 82. A perforating gun 83 located at a selected depth at or slightly below the level 15a of the liquid, is energized to fire an explosive to produce an acoustic pulse which travels to and is detected by seismometer 80. By this means also, the time datum may be established.

As above indicated, a first approach to the integration of the travel time log is accomplished by simultaneously applying a travel time or Δt signal to an integration unit to produce a continuous record or indication of total travel time. The integrator illustrated in Fig. 6 has been found suitable for carrying out the present invention in accordance with this first approach.

Figure 6:
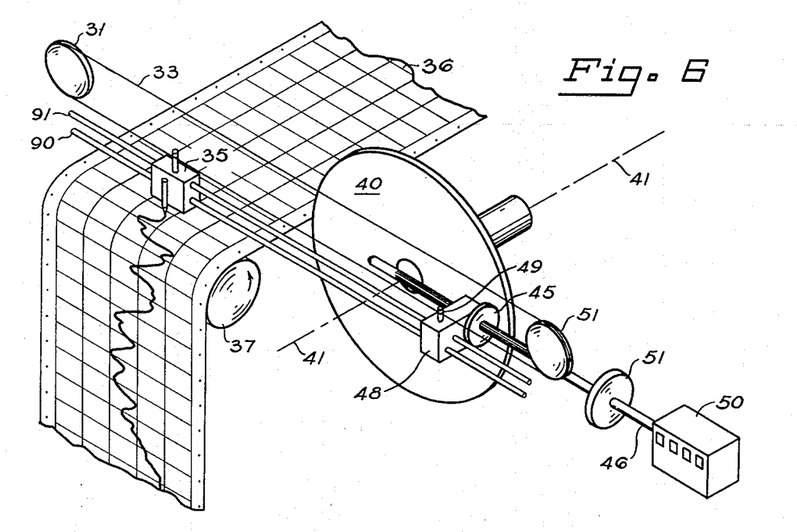
Fig. 6 is a detailed illustration of the integrating means of the system of Fig. 2.

Referring now to Fig. 6, details of the integrating mechanism of Fig. 2 have been shown. Where consistent, like parts have been given the same reference characters. As here illustrated, the pen carriage 35 and the follower wheel carriage 48 are slidably supported on a pair of guide rods 90 and 91. The belt 33 is anchored or connected to both carriage 35 and carriage 48 to move them simultaneously across the face of chart 36 and across the face of disk 40, respectively. The carriage 48 and follower wheel 45 are slidable along the splines in the shaft 46 with follower wheel 45 in contact with disk 40. As best shown in Fig. 7, the splined shaft 46 meshes with the interior of a shaft 45a which is journaled in the carriage 48 and which is rigidly secured to or is integral with the follower wheel 45. Thus when carriage 48 moves with the belt 33, there is sliding movement between shaft 46 and shaft 45a. When carriage 48 is stationary but disk 40 is rotating, there is relative roational motion between the shaft 45a and carriage 48. By the means above described, rotation of shaft 46 is caused to be directly proportional to the depth integral of the curve shown on chart 36a of Fig. 2.

Figure 8:
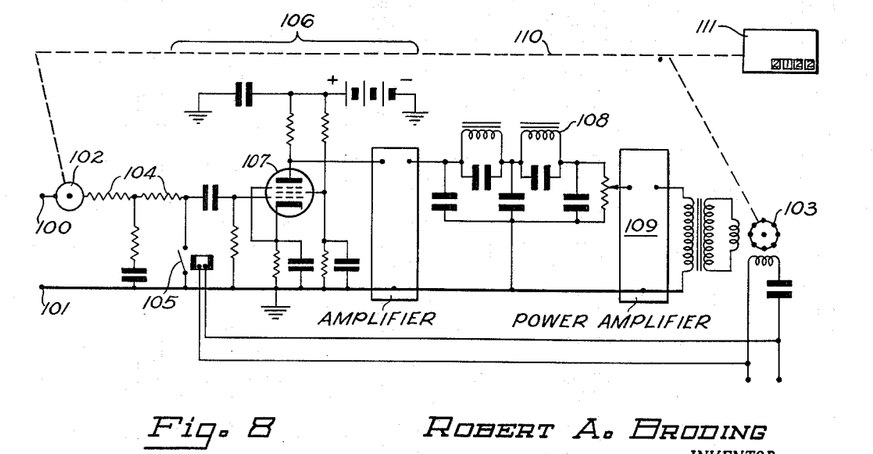
Fig. 8 is a schematic diagram of an alternate form of integrating means.

Continuous integration of the travel time record may also be carried out by use of the integrator shown in Fig. 8. Here the signal appearing on channel 21, Fig. 1, is applied ot input terminals 100 and 101. This integrating system includes a D.C. generator 102 which, upon rotation under control of the driving motor 103, produces a unidirectional voltage opposite in sense to the input voltage to terminals 101. The sum of the applied and generated voltage appears in the network 104 and is chopped by the vibrator unit 105 so that an alternating current is applied to the amplifier 106 whose input tube has been shown as tube 107. Filter 108 serves to eliminate from the input circuit of power amplifier 109 all voltages except that of frequency of the chopper 105. The output of power amplifier 109 is applied to one phase of two phase windings associated with the motor 103. The second phase on motor 103 is excited in synchronism with and from the same source which provides the excitation for the chopper 105.

Motor 103 is driven at a speed proportional to the difference between the instantaneous value of the voltage produced on channel 21 and the voltage produced by the generator 102. This, in effect, is an electromechanical feed-back system which attempts to maintain the voltage or the current in the input circuit of tube 107 at a substantially zero level. As is well understood by those skilled in the art, the input signal to amplifier 106 approaches zero as the amplification in the feed-back loop approaches infinity. Operation is such that the greater the difference between the input voltage and the generated voltage, the faster motor 103 is driven. Thus the number of revolutions of motor 103 is directly proportional to the time integral of the voltage on channel 21. As the logging system shown in Fig. 1 is moved along the length of the bore hole at a constant rate, the rotation of the motor 103 and its driving shaft 110 is directly proportional to the depth integral of the voltage on channel 21. In this integrating system then the counter 111 may be driven by the shaft 110 to record continuously the integral of the voltage applied to the input of the system.

In accordance with the second approach to producing an integrated or total travel time indication of the formations penetrated by a particular bore hole, the system illustrated in Fig. 4 may be used in the following manner. The exploring unit 10 is lowered at least to the liquid level in an open hole section of the bore hole. Below that point a Δt log is obtained by acoustically coupling the continuously changing earth sections spanned by the bore hole tool as it is lowered to a second depth point below the liquid level. The log thus produced will emphasize zones along the length of the bore hole of high acoustic contrasts. Thereafter as the unit 10 is drawn toward the surface it is brought to rest at the contrasting zones indicated by the log produced during the downward travel of the instrument. While the unit 10 is at each such zone, an explosive charge is detonated at or near the earth's surface in the manner described in connection with Fig. 3 to measure the total travel time to each region from the depth of the explosive charge. This essentially is a series of integrations between the depth of the shot and the depth of each selected zone. The limits of each integration are obtained from the Δt log.

It will now be recognized that this second approach is characterized by a single run in the bore hole in which the formations are continuously probed during the downward travel of the exploring unit to locate selected points at which measurements will be made or integrations performed during the upward travel of the instrument. By combining the continuous measurement with the point measurement, greater accuracy in the integrated data can be obtained than in the conventional case where a downhole geophone is located at selected arbitrary intervals not necessarily related to lithology. More important, however, is the fact that the difficulty encountered in clearly recording the instant of arrival of a surface generated pulse at depths of 5,000 to 10,000 feet is obviated by use of the continuous probing operation. However, the use of the continuous Δt procedure together with measurements only at contrasting velocity zones has been found to be advantageous as the first step not only serves as a guide to the other but together they serve to check the other.

The foregoing has presented in detail the method of obtaining useful data for interpretation of seismic records and for estimating the possible petroleum productive capacities of formations. It should now be noted, however, that the integration steps in this method either in the first or second approach may also be performed by hand. More particularly, a continuous travel time or Δt log such as shown at 36a in Fig. 3 may be integrated by conventional means, for example, by using a planimeter which measures the area under the curve on chart 36a. The area between any two depth points is a measure of the time required for travel of a pulse over the section between the points.

As above indicated, a record which is the depth integral of the voltage from the detecting unit 20 represents total travel time plus a linearly increasing error function. That is because the measured interval Δt includes as a fraction thereof the time required for a sound pulse to be transmitted from the generator to the formations and from the formations to the receiver in the downhole instrument. It has been found that this error is substantially independent of bore hole fluid character and bore hole diameter and primarily is a unique characteristic of a given exploring unit. That is each particular exploring unit will require a characteristic time interval not associated with formation travel time. This interval has been designated as the "formation driving time" for a pair of transducers and will be so designated herein.

It has been found that the time Δt for a pulse to travel over the earth segment spanned by the downhole logging instrument may be expressed as follows:

$$\Delta t = \frac{s}{v} + k \quad (1)$$

where s is the distance between the transmitter 11 and receiver 13 of Fig. 1; and k is the formation driving time for a given instrument.

As above described, the log 36a, Fig. 2, is a continuous plot of the above Δt function. In order to produce a number on the counter 50 (or the integrated log 55a) that is directly proportional to the total travel time, a compensating system may be used which will eliminate the effect of the error function (k). Upon consideration of Equation 1 it may be shown that the total travel time T to any given depth (D) below datum may be expressed as follows:

$$T \alpha A - KD \quad (2)$$

where

A is the area under the curve of chart 36a between datum and the selected depth point; and K is a constant involving k and s.

Fig. 9 illustrates one system suitable for producing a correcting function, either to make a corrected log or to produce an indication on a numerical counter of the true total travel time. Two input functions are applied to this system. The first input function is directly proportional to the number of revolutions of shaft 46. The second function is directly proportional to depth. As here shown, a first potentiometer 115 is connected in series circuit with a battery 116. One terminal of battery 116 is connected to ground and to an output terminal 117. The variable tap 118 on potentiometer 115 is driven mechanically in a counterclockwise direction in accordance with the first function, the rotation of shaft 46. Preferably a gear train 119 is used to provide a suitable driving speed for the tap 118. The tap 118 is connected electrically by means of conductor 120 to one terminal of a second potentiometer 121 across which there is connected a battery 121a. The variable tap 122 on potentiometer 121 is connected electrically to the second output terminal 123. Tap 122 is driven in a clockwise direction in proportion to the second function, the depth of the exploring unit as sensed by the Selsyn receiver 39. The output shaft of receiver 39 is mechanically coupled to the tap 122.

In operation, at the beginning of a given logging operation the tap 118 will be positioned at the output terminal side of potentiometer 115 (that is in the position shown) and tap 122 will be positioned at point 124 of potentiometer 121. The voltage in the output circuit will thereafter be proportional to the angular displacement of tap 118 as it is driven counterclockwise to produce a first line integral having time as one variable and distance from the point of beginning of the given logging operation as the second variable. At the same time the voltage will be proportionally decreased by an amount equal to a correcting function which is the line integral of the product of a scaling factor the same as the scaling factor of the time function in the first line integral, multiplied by the formation driving time. This second line integral is produced by rotation of tap 122 as the logging unit is lowered into a bore hole. The voltage appearing between terminals 117 and 123 will be proportional to travel time of a pulse in formations only and will be unaffected by individual exploring unit characteristics. The voltage between terminals 117 and 123 may then be utilized to actuate a counter such as counter 50, Fig. 6, or to actuate a recording unit such as the recording unit of Fig. 1 employed to produce a record on chart 36 to produce a corrected total travel time log.

While several modifications of the invention have been described in detail, it will be understood that further modifications will now suggest themselves to those skilled in the art and it is intended to cover such modifications as fall within the scope of the appended claims.

What is claimed is:

1. The method of geophysical exploration which comprises probing with acoustic pulses earth segments of constant length over a section beginning at a first point along the wall of a bore hole and changing progressively to a second point in said bore hole, generating a sensible indication in response to said probing having variations equal in magnitude to the product of the variations in the incremental travel time of said pulses through said segments multiplied by a scaling factor, integrating said sensible indication to produce a line integral having one variable related to time by said scaling factor, and registering said line integral on a distance proportional scale related to distances from said first point in said earth section.

2. The method which comprises probing with acoustic pulses incremental earth segments of constant length along the wall of a bore hole at locations continuously and progressively deeper in said hole, generating a signal in response to said probing which varies in accordance with variations in the incremental travel time of said pulses through said segments to locate zones of acoustic velocity contrast, integrating the incremental travel times of formations between a selected depth datum and said zones, and recording the integration products thereby to determine the total time required for travel of acoustic energy from said datum to any one of said zones.

3. A method of measuring the velocity of earth formations penetrated by a bore hole which comprises probing with acoustic pulses earth segments between a selected datum in said well bore and progressively increasing distances below said datum, generating a function in response to said probing which varies in accordance with incremental travel time of said pulses over constant length earth segments, summing the total time of travel between said datum and points below said datum where contrasts in said time of travel produce variations in said function and recording the resultant sums.

4. In a well logging system where an exploring unit is moved along the length of a well bore to produce a signal which varies in accordance with variations in the travel time character of formations along said well bore, the combination which comprises a disk mounted for rotation about its axis, a rotatable member movable along a radial line on said disk and maintained in point contact with the face thereof, means for rotating said disk in proportion to movement of said exploring unit along said bore hole, means for varying the radial position of said point contact in accordance with said signal, means for translating rotation of said movable member into a sensible indicia, and means for registering said indicia on a depth scale whereby the total travel character of said formations may be obtained.

5. In a well logging system where an exploring unit is moved along the length of a well bore to produce a signal which varies in accordance with variations in the travel time character of formations along said well bore, the combination which comprises a disk mounted for rotation about its axis, a rotatable member movable along a radial line on said disk and maintained in point contact with the face thereof, an electromechanical coupling between said exploring unit and said disk for rotating said disk in proportion to movement of said exploring unit along said bore hole, means for varying the radial position of said point contact on said disk in accordance with said signal, and recording means responsive to variations in position of said exploring unit and said rotatable member for producing a record of the total travel time character of formations adjacent said well bore as a function of depth.

6. In a well logging system where an exploring unit is moved along the length of a well bore to produce a signal which varies in accordance with variations in the travel time character of formations along said well bore, the combination which comprises a disk mounted for rotation about its axis, a rotatable member movable along a radial line on said disk and maintained in point contact with the face thereof, proportioning means interconnecting said unit and said disk for translating movement of said exploring unit along said bore hole into rotation of said disk, proportioning means for translating variations in said signal into variations in the radial position of said point contact on said disk, and registering means coupled to said rotatable member and to said exploring unit for summing the motion of said rotatable member on a depth scale.

7. A well logging system which comprises means including an acoustic bore hole exploring unit and a sensing system for producing a first function which varies in response to variations in the velocity of sound as said unit is continuously moved along the length of said bore hole integrating means responsive to said first function producing means for generating a second function representative of a continuously increasing time interval, and means for recording said second function in correlation with depth of said unit in said bore hole.

8. The method of geophysical exploration which comprises probing with acoustic pulses earth segments of constant length over a section beginning at a first point along the wall of a bore hole and changing progressively to a second point in said bore hole, generating a signal in response to said probling with variations in magnitude equal to the product of the variations in the incremental travel time of said pulses through said segments multiplied by a scaling factor, integrating said signal to produce a first line integral having time as one variable and distance from said first point as a second variable, generating a correcting function equal to the line integral of the product of said scaling factor multiplied by the formation driving time, and subtracting said correcting function from said first line integral whereby the difference is equal to the travel time of a pulse from said first point to said second point.

9. The method of geophysical exploration which comprises probing with acoustic pulses earth segments of constant length beginning at a first point along the wall of a bore hole and moving progressively to a second point in said bore hole, generating a voltage in response to said probing with variations in magnitude equal to the product of the variations in the incremental travel time of said pulses through said segments multiplied by a scaling factor, integrating said voltage to produce a first line integral having time as one variable and distance from said first point as a second variable, generating a correcting function equal to the line integral of the product of said scaling factor multiplied by the formation driving time, and subtracting said correcting function from said first line integral whereby the difference is equal to the travel travel time of a pulse from said first point to said second point.

10. The method of geophysical exploration which comprises probing with acoustic pulses earth segments of constant length over a section beginning at a first point along the wall of a bore hole and changing progressively to a second point in said bore hole, producing a displacement in response to said probing varying in magnitude by an amount equal to the product of the variations in the incremental travel time of said pulses through said segments multiplied by a scaling factor, integrating said displacements to produce a line integral having one variable related to time by said scaling factor and distance from said first point as a second variable, generating a correcting function equal to the line integral of the product of said scaling factor multiplied by the formation driving time and subtracting said correcting function from said first line integral whereby the difference is proportional to the travel time of a pulse from said first point to said second point.

11. The method of geophysical exploration which comprises transmitting a single acoustic pulse over an earth section having as its extremities a known near surface point and a datum in an open-hole section below the level of liquids in a bore hole located adjacent said near surface point, recording on a time scale the instant said single pulse appears at one of said extremities and the instant of its arrival at the other of said extremities, probing with repeated acoustic pulses incremental earth segments of constant length along the wall of said bore hole at locations changing continuously and progressively in depth at and below said datum, generating a signal in response to said probing which varies in accordance with variations in the incremental travel time of said pulses over said incremental segments, integrating the incremental travel time signal, and recording the integral on a depth scale whereby the total time of travel of an acoustic pulse from said near surface point to any selected depth below said datum is equal to the travel time of said single acoustic pulse to datum plus the value of said integral at the point on said scale corresponding with said selected depth.

12. The method of measuring the travel time character of earth formations penetrated by a bore hole which comprises generating repeated acoustic pulses and detecting said pulses locally at a datum in an open-hole section below the level of liquids in a bore hole and at continuously and progressively increasing depths below said datum, producing a signal in response to said pulses and which varies in accordance with variations in the travel time of said pulses over incremental earth sections at said continuously and progressively increasing depths, recording said signal to delineate zones below datum of highly contrasting travel time character, at said zones successively decreasing in depth generating seismic-type pulses, detecting said pulses at the earth's surface, and recording on a time scale the instants of generation of said pulses and the instants of arrival at the earth's surface.

13. The method of measuring the travel time characteristic of earth formations penetrated by a bore hole which comprises probing with acoustic pulses constant length earth segments located at a datum in said well bore and at continuously and progressively increasing distances below said datum, generating a signal in response to said probing which varies in accordance with variations in incremental travel time of said pulses over each of said segments, recording said signal as a continuous function on a scale proportional to depth to delineate zones in said bore hole of highly contrasting travel time character, generating acoustic pulses at a point of known relation with respect to said datum, and successively detecting said last named pulses at the depth of the deepest of said zones and at the depths of successively shallower zones.

14. A well logging system which comprises means including an acoustic bore hole exploring unit and a sensing system for producing a first function which varies in accordance with variations in the velocity of sound over constant length segments along a section of said bore hole, integrating means responsive to said first function over an integration interval corresponding with the space limits of said earth section for generating a second function representative of a continuously increasing time interval, and means for recording said second function in correlation with the depth and length of said section in said bore hole.

15. A system for geophysical exploration which comprises an exploring unit for probing with acoustic pulses earth segments of uniform length in a section between a first and second depth point in a bore hole, a sensing system responsive to said probing for generating a signal which varies in dependence upon variations in the time of travel of said acoustic pulses over said earth segments multiplied by a scaling factor, an integrating system responsive to said first function for producing a line integral thereof having time as one variable and distance from one extremity of said section as a second variable, means for generating a correcting function equal to the line integral of the product of said scaling factor multiplied by the formation driving time of said exploring unit, and means for subtracting said correcting function from said first line integral whereby the difference is equal to the travel time of a pulse over said section.

16. The combination which comprises means for producing primary log functions consisting of a depth function representative of continuously increasing distances from a selected datum level in a well bore and an acoustic velocity function which varies in dependence upon variations in the velocity of sound in the formations at points along said well bore represented by said depth function, means for converting said acoustic velocity function by integration with reference to said depth function into a total travel time function which varies as the time required for acoustic energy to travel from said datum level to the points represented by said depth function, and means for producing a chart recording with values of said total travel time function plotted along a first axis thereof and values of one of said primary log functions plotted along a second axis thereof.

17. In a well logging system the combination which comprises means for producing primary log functions consisting of a depth function representative of continuously increasing distances from a selected datum point in a well bore and an acoustic velocity function which varies in dependence upon variations in the velocity of sound of formations adjacent said well bore at points at and below said datum level represented by said depth function, means for integrating said acoustic velocity function in relation to said depth function to produce a total travel time function which varies in a manner representative of the time required for an acoustic pulse to travel from said datum level to the points in said well bore represented by said depth function whereby said total travel time function may be recorded in correlation with one of said primary log functions.

18. In a well logging system the combination which comprises means for producing primary log functions consisting of a depth function representative of continuously increasing distances from a selected datum level in a well bore and an acoustic velocity function representative of the time required for sound to travel over equal length earth segments located at the points in said well bore represented by said depth function, integrating means responsive to said depth function and to said velocity function for producing a total travel time function which varies as the time required for an acoustic pulse to travel from said datum level to the points represented by said depth function, and means for producing a chart recording with values of said total travel time function plotted along a first axis thereof and values of one of said primary log functions plotted along a second axis thereof.

19. The combination which comprises means for producing primary log functions consisting of a depth function representative of continuously increasing distances from a selected datum level in a well bore and an acoustic velocity function which varies in dependence upon variations in the velocity of sound in the formations at points along said well bore represented by said depth function, means for converting said acoustic velocity function by integration with reference to said depth function into a total travel time function which varies as the time required for acoustic energy to travel from said datum level to the points represenetd by said depth function, and means for recording one of said primary log functions and said total travel time function with one of them the independent variable and one of them the dependent variable.

20. In connection with acoustic velocity well logging the combination which comprises means for producing signals including a depth signal and an acoustic velocity controlled signal, means for producing from said signals primary log functions consisting of a depth function representative of continuously increasing distances from a selected datum level in a well bore and an acoustic velocity controlled function which varies in dependence upon variations in the velocity of sound in the formations at points along said well bore represented by said depth function, means for converting said acoustic velocity controlled signal by integration with reference to said depth signal into a total travel time function which varies as the time required for acoustic energy to travel from said datum level to the points represented by said depth function, and means for recording said total travel time function and one of said primary log functions with one of them the independent variable and one of them the dependent variable.

References Cited in the file of this patent

UNITED STATES PATENTS

| | | |
|---|---|---|
| 2,233,992 | Wyckoff | Mar. 4, 1941 |
| 2,275,736 | Cloud | Mar. 10, 1942 |
| 2,301,458 | Salvatori | Nov. 10, 1942 |
| 2,449,310 | Moreau | Sept. 14, 1948 |

UNITED STATES PATENT OFFICE
CERTIFICATE OF CORRECTION

Patent No. 2,905,258

September 22, 1959

Robert A. Broding

It is hereby certified that error appears in the printed specification of the above numbered patent requiring correction and that the said Letters Patent should read as corrected below.

Column 1, line 38, after "practice" insert a comma; column 3, line 66, after "of" insert -- the --; column 4, line 28, after "15a" insert a comma; column 5, line 31, after "55a" insert a comma; column 6, lines 4 and 5, strike out "application"; line 73, for "roatational" read -- rotational --; column 7, line 6, for "ot" read -- to --; column 10, line 5, after "function" insert a comma; line 58, after "hole" insert a comma --; line 69, for "probling" read -- probing --; column 11, line 37, after "time" insert a comma.

Signed and sealed this 8th day of March 1960.

(SEAL)
Attest:

KARL H. AXLINE
Attesting Officer

ROBERT C. WATSON
Commissioner of Patents